(12) United States Patent
Bae et al.

(10) Patent No.: US 9,041,999 B2
(45) Date of Patent: May 26, 2015

(54) ELECTROWETTING DEVICE AND METHOD OF MANUFACTURING THE SAME

(75) Inventors: Ki-deok Bae, Yongin-si (KR); Jun-sik Hwang, Hwaseong-si (KR); Chang-youl Moon, Suwon-si (KR); Yoon-sun Choi, Yongin-si (KR); Jung-mok Bae, Seoul (KR); Chang-seung Lee, Yongin-si (KE); Eok-su Kim, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 35 days.

(21) Appl. No.: 13/597,986

(22) Filed: Aug. 29, 2012

(65) Prior Publication Data
US 2013/0050802 A1 Feb. 28, 2013

(30) Foreign Application Priority Data
Aug. 30, 2011 (KR) ........................ 10-2011-0087343

(51) Int. Cl.
*G02B 26/00* (2006.01)
(52) U.S. Cl.
CPC .................................... *G02B 26/005* (2013.01)
(58) Field of Classification Search
USPC ......................................... 359/665, 666, 619
See application file for complete search history.

(56) References Cited

U.S. PATENT DOCUMENTS

| 2006/0079728 A1 | 4/2006 | Kuiper et al. | |
| 2009/0257111 A1* | 10/2009 | Heikenfeld et al. | 359/295 |
| 2011/0299171 A1* | 12/2011 | Sato et al. | 359/619 |

FOREIGN PATENT DOCUMENTS

| JP | 2006195096 A | 7/2006 |
| KR | 1998052414 A | 9/1998 |
| KR | 20090019207 A | 2/2009 |
| KR | 20090126461 A | 12/2009 |
| KR | 10-2011-0090682 | 8/2011 |

* cited by examiner

*Primary Examiner* — James Jones
(74) *Attorney, Agent, or Firm* — Harness, Dickey & Pierce, P.L.C.

(57) ABSTRACT

In one embodiment, the electrowetting device includes a first medium; a second medium that is not mixed with the first medium and has a refractive index different from a refractive index of the first medium; an upper electrode that adjusts an angle of a boundary surface between the first medium and the second medium; and a barrier wall that has a side surface surrounding the first and second mediums, allows the upper electrode to be disposed on a portion of the side surface, and has irregular widths.

20 Claims, 16 Drawing Sheets

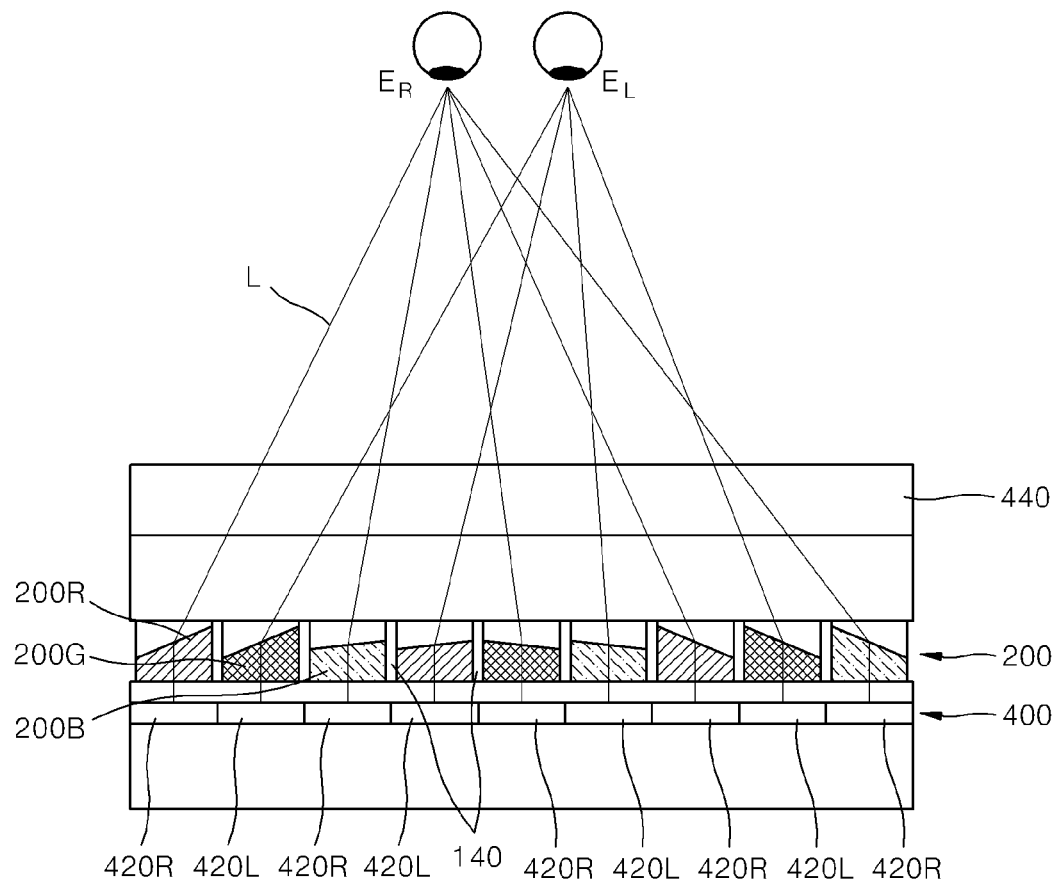

(a)

(b)

(a)

(b)

(a)

(b)

(a)

(b)

(a)

(b)

(a)

(b)

(a)

(b)

ELECTROWETTING DEVICE AND METHOD OF MANUFACTURING THE SAME

CROSS-REFERENCE TO RELATED APPLICATIONS

This application claims the benefit of Korean Patent Application No. 10-2011-0087343, filed on Aug. 30, 2011, in the Korean Intellectual Property Office, the disclosure of which is incorporated herein in its entirety by reference.

BACKGROUND

1. Field

Example embodiments relate to electrowetting devices, devices including the same, and/or methods of manufacturing the electrowetting devices.

2. Description of the Related Art

In general, electrowetting refers to a situation where the interfacial tension of a fluid is changed due to a voltage applied to the fluid and thus the fluid migrates or deforms.

Electrowetting is applied to a reflective display device in which a voltage is applied to water in a limited space of one pixel including a waterproof insulating substance, an electrode, a hydrophilic liquid, and a hydrophobic liquid, to change the surface tension of the water and to cause the hydrophobic liquid to migrate. During the operation of the reflective display device using electrowetting, a positive voltage and a negative voltage are respectively applied to the water and the waterproof insulating substance to make oil having a color migrate to one side, and overall colors are adjusted by changing reflected light. Examples of a device using electrowetting may include a liquid lens, a micro pump, a display device, an optical device, and a micro-electromechanical system (MEMS).

Recently, an electrowetting display device has been spotlighted as a desired flat panel display device because of its smaller size, lower power consumption, shorter response time, and higher color brightness.

A device driven by electrowetting needs a barrier wall for receiving a polar solution and a non-polar solution and an upper electrode for controlling a boundary surface between the polar solution and the non-polar solution. Research on a method of forming the barrier wall and the upper electrode on a substrate has been actively conducted.

SUMMARY

Some example embodiments provide electrowetting devices that can be easily manufactured.

Some example embodiments provide three-dimensional (3D) image display devices that may increase a viewing angle by using the electrowetting devices.

Some example embodiments provide methods of manufacturing the electrowetting devices.

Additional aspects will be set forth in part in the description which follows and, in part, will be apparent from the description, or may be learned by practice of example embodiments.

According to an example embodiment, an electrowetting device includes a first medium; a second medium, the second medium not mixed with the first medium and having a refractive index different from a refractive index of the first medium; an upper electrode, the upper electrode configured to adjust an angle of a boundary surface between the first medium and the second medium; and a barrier wall, a side surface of the barrier wall surrounding the first and second mediums, the barrier wall having the upper electrode on a portion of the side surface and having irregular widths.

Widths of a portion of the barrier wall where the upper electrode is disposed and another portion of the barrier wall where the upper electrode is not disposed may be different from each other.

The barrier wall may include a first portion on which the upper electrode is disposed; and a second portion connected to the first portion and having a width greater than a width of the first portion.

The electrowetting device may further include a protrusion protruding laterally from an upper end of the second portion.

The protrusion may have a tapered shape, the width of which is reduced downward.

The electrowetting device may further include: a substrate; a lower electrode that is partially disposed on the substrate; and an insulating layer that is disposed on the substrate and the lower electrode and has a via-hole through which the lower electrode is partially exposed, wherein the upper electrode is connected to the lower electrode through the via-hole.

The barrier wall may include a photosensitive material.

The electrowetting device may further include an insulating layer that has a hydrophobic surface covering the upper electrode.

The first medium may be a non-polar liquid including a color dye, and the second medium may be a polar liquid.

The first medium may be a polar liquid including a color dye, and the second medium may be a non-polar liquid.

An electrowetting device array may include a plurality of the electrowetting devices, wherein the plurality of electrowetting devices are arranged in a two-dimensional (2D) lattice structure.

The barrier walls of the plurality of electrowetting devices may be connected to one another.

According to another example embodiment, an image display device includes a light source configured to emit light; a light-modulating panel configured to modulate the light according to image information and form image gradation; and an electrowetting device array including a plurality of the aforementioned electrowetting devices configured to adjust directivity by assigning a color to each of the light beams transmitted through pixels of an image.

The image display device may further include a control unit configured to control the electrowetting device array such that light beams of a plurality of pixels of the image are separated into at least two different viewing zones in a three-dimensional (3D) mode, and paths of the light beams of the plurality of pixels of the image are maintained in a 2D mode.

The control unit is configured to control the boundary surface to be inclined with respect to the light-modulating panel in the 3D mode, and to be parallel to the light-modulating panel in the 2D mode.

The electrowetting device array may include: a first electrowetting device that includes the first medium of a red color; a second electrowetting device that includes the first medium of a green color; and a third electrowetting device that includes the first medium of a blue color.

According to another example embodiment, a method of manufacturing an electrowetting device includes forming a lower electrode on a substrate; forming a photosensitive material layer on the substrate and the lower electrode; forming a barrier wall having irregular widths and providing a cell region by exposing the photosensitive material to light; depositing an upper electrode on a portion of the barrier wall; and injecting into the cell region a first medium and a second medium, the second medium not being mixed with the first medium and having a refractive index different from a refractive index of the first medium.

A protrusion may protrude laterally from an upper end of the barrier wall.

The protrusion may have a tapered shape of which the width is reduced downward.

The barrier wall may be formed by being exposed to light through a plurality of different exposure masks several times.

The forming of the barrier wall may include: disposing a first exposure mask on the photosensitive material layer to cover the cell region and the protrusion and performing first exposure; disposing a second exposure mask on the photosensitive material layer to cover the cell region and performing second exposure; and exposing an exposed portion of the photosensitive material layer to a developer.

An amount of light exposed during the first exposure may be greater than an amount of light exposed during the second exposure.

The upper electrode may be deposited on a portion of a side surface of the barrier wall where the protrusion is not formed.

Before the forming of the photosensitive material layer, the method may further include: forming an insulating layer on the substrate and the lower electrode; and forming in the insulating layer a via-hole through which the lower electrode is partially exposed.

BRIEF DESCRIPTION OF THE DRAWINGS

These and/or other aspects will become apparent and more readily appreciated from the following description of the embodiments, taken in conjunction with the accompanying drawings in which:

FIG. 8A is a cross-sectional view illustrating an operation of the image display device of FIG. 7 in a 3D mode;

DETAILED DESCRIPTION

Figure 1:
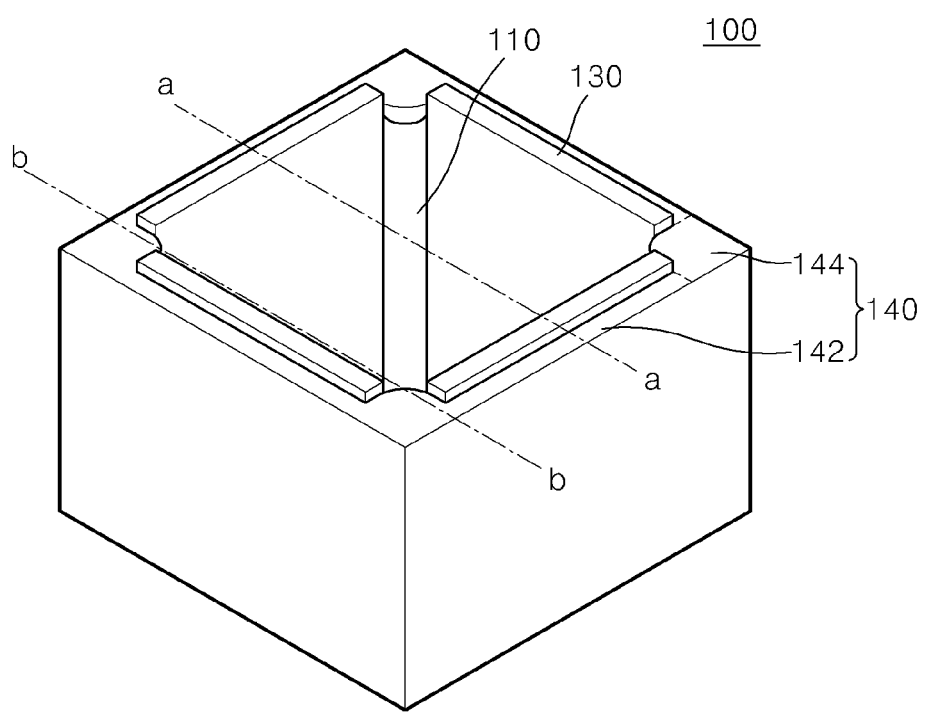
FIG. 1 is a perspective view illustrating an electrowetting device according to an example embodiment.

Example embodiments will now be described more fully with reference to the accompanying drawings, in which exemplary embodiments of the invention are shown. In the drawings, widths and thicknesses of layers or regions may be exaggerated for clarity. The same reference numerals in the detailed description of the invention denote the same elements. In this regard, example embodiments may have different forms and should not be construed as being limited to the descriptions set forth herein. Accordingly, the embodiments are merely described below, by referring to the figures, to explain aspects of example embodiments.

Example embodiments will be explained in detail with reference to the attached drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
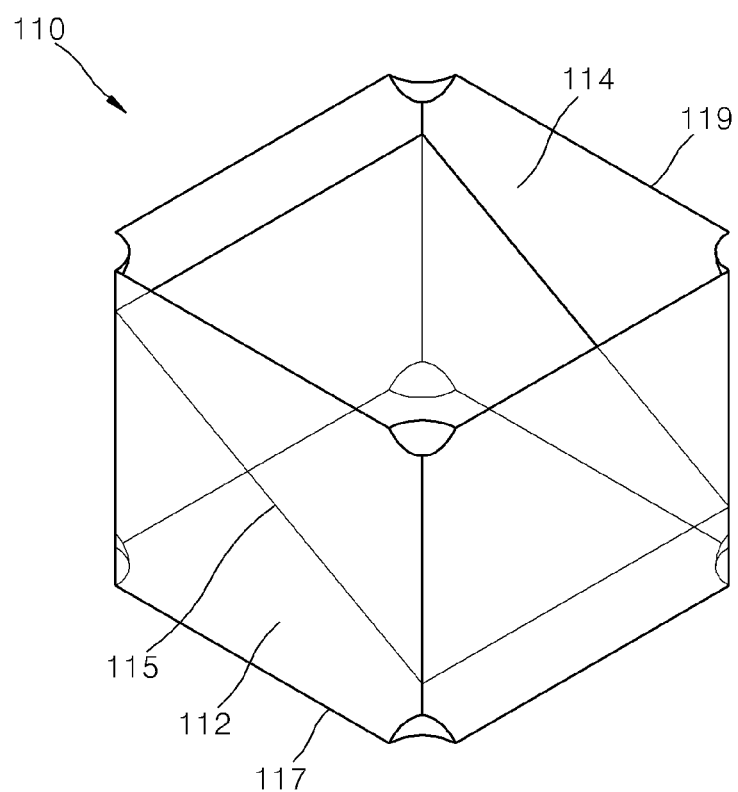
FIG. 2 is a view illustrating a cell region of the electrowetting device of FIG. 1.
Figure 3:
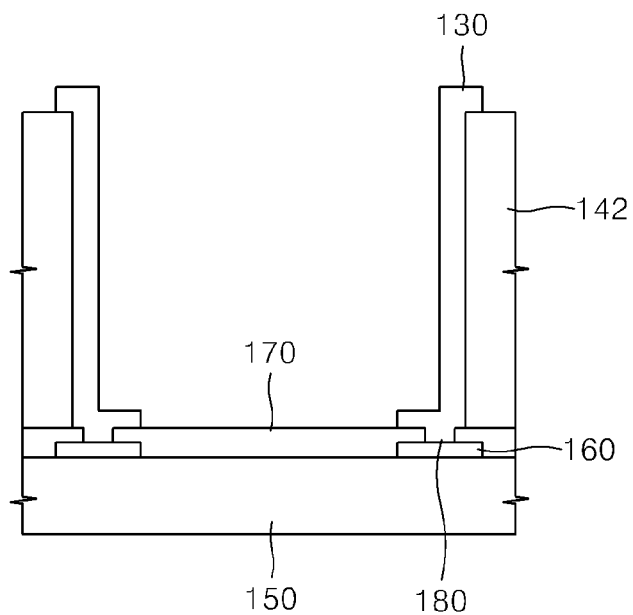
FIG. 3 is a cross-sectional view taken along line a-a of FIG. 1.
Figure 4:
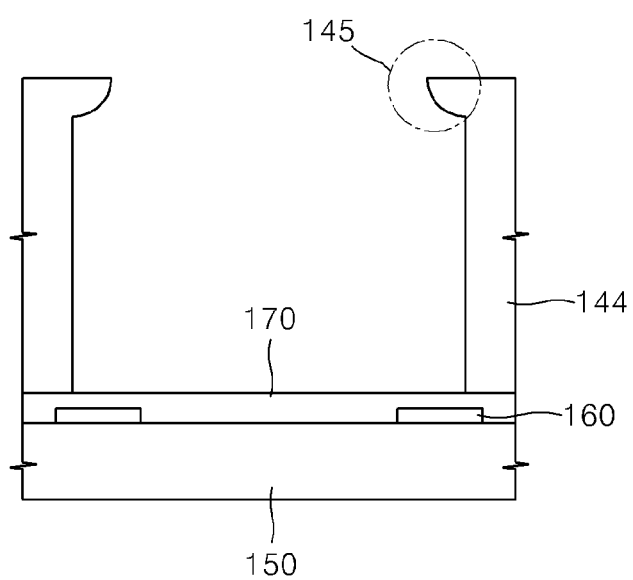
FIG. 4 is a cross-sectional view taken along line b-b of FIG. 1.

FIG. 1 is a perspective view illustrating an electrowetting device 100 according to an example embodiment. FIG. 2 is a view illustrating a cell region 110 of the electrowetting device 100 of FIG. 1. FIG. 3 is a cross-sectional view taken along line a-a of FIG. 1. FIG. 4 is a cross-sectional view taken along line b-b of FIG. 1.

Referring to FIGS. 1 through 4, the electrowetting device 100, which is a device for adjusting an angle at which light is emitted according to an electrical signal, may include a first medium 112 and a second medium 114 which have different refractive indices, and the cell region 110 in which the first medium 112 and the second medium 114 are stored.

Any one of the first medium 112 and the second medium 114 may be a polar liquid such as water, and the other medium may be a non-polar liquid such as oil. Any one of the first medium 112 and the second medium 114 may be a medium having a color, and the other medium may be a transparent medium. For example, the first medium 112 may be a non-polar liquid including a color dye, and the second medium 114 may be a polar liquid. Alternatively, the first medium 112 may be a polar liquid including a color dye, and the second medium 114 may be a non-polar liquid. And, the first and second medium 112, 114 may be a transparent medium. Accordingly, a boundary surface 115 between the first medium 112 and the second medium 114 is a refractive surface, and an angle at which light is emitted is changed as a gradient of the boundary surface 115 is changed.

The cell region 110 may include a light incident surface 117, a light-emitting surface 119 facing the light incident surface 117, and a plurality of side walls disposed between the light incident surface 117 and the light-emitting surface 119. For example, the cell region 110 may have a polygonal cross-sectional shape. However, embodiments are not limited thereto, and a cross-sectional shape of the cell region 110 may be a circular shape, or a combination of a circular shape and a polygonal shape.

The electrowetting device 100 may further include upper electrodes 130 that adjust an angle of the boundary surface 115 between the first medium 112 and the second medium 114.

The upper electrodes 130 may be formed of a transparent conductive material. For example, the upper electrodes 130 may be formed of a carbon nanostructure such as carbon nanotubes (CNTs) or graphene, a conductive polymer such as polypyrrole, polyaniline, polyacetylene, polythiophene, polyphenylene vinylene, polyphenylene sulfide, poly p-phenylene, or polyheterocycle vinylene, a metal oxide such as indium tin oxide (ITO), aluminum zinc oxide (AZO), indium zinc oxide (IZO), tin oxide (SnO2), or $In_2O_3$, or a thin film containing metal nanoparticles such as aluminum (Al), copper (Cu), gold (Au), or silver (Ag). In order to change a gradient of the boundary surface 115 between the first medium 112 and the second medium 114, a least two upper electrodes 130 are needed, and four upper electrodes 130 are illustrated in FIG. 1. The number of upper electrodes 130 may vary according to a method of driving the electrowetting device 100.

A barrier wall 140 may surround the cell region 110. Each of the upper electrodes 130 may be disposed on a portion of the barrier wall 140. The barrier wall 140 formed of a black material for blocking light may function as a black matrix for preventing adjacent light beams passing through the electrowetting device 100 from overlapping with each other to prevent crosstalk.

Also, the barrier wall 140 may be formed of a photosensitive material. For example, the photosensitive material may be solid powder which chemically reacts with light, or a solvent which volatilizes. The viscosity of the photosensitive material may be adjusted by adjusting a ratio between the solid powder and the solvent. Also, a surfactant may be included in the photosensitive material. The surfactant may be formed such that the photosensitive material has a uniform thickness.

The upper electrodes 130 may be disposed on the side surfaces of the barrier wall 140. A width of a portion of the barrier wall 140 on which one of the upper electrodes 130 is disposed and a width of a portion of the barrier wall 140 on which any of the upper electrodes 130 is not disposed may be different from each other. For example, the barrier wall 140 may include a first portion 142, an upper end of which has a first width, on which the upper electrode 130 is disposed. The barrier wall 140 also includes a second portion 144 connected to the first portion 142 and having an upper end with a second width greater than the first width. The first portion 142 and the second portion 144 may be alternately connected to each other. Since at least two upper electrodes 130 are needed, the barrier wall 140 needs at least two first and second portions 142 and 144.

The first portion 142 of the barrier wall 140 may have a uniform width irrespective of a thickness $t_1$ (FIG. 11), whereas the second portion 144 of the barrier wall 140 may have a width which varies according to the thickness. For example, a protrusion 145 may protrude laterally from an upper end of the second portion 144. The protrusion 145 may have a tapered shape of which the width is reduced downward from the barrier wall 140.

Also, the electrowetting device 100 may further include a first substrate 150 that supports the barrier wall 140, a lower electrode 160 that connects the upper electrode 130 and a power supply unit (not shown) and is partially disposed on the first substrate 150, and a first insulating layer 170 that covers the first substrate 150 and the lower electrode 160. The first substrate 150 may be formed of a transparent material through which light is transmitted, such as glass. A via-hole 180 through which the lower electrode 160 is partially exposed may be formed in the first insulating layer 170. Through the via-hole 180, the upper electrode 130 may extend to be connected to the lower electrode 160. The lower electrode 160 may be formed of the same material as that of the upper electrode 130. The lower electrode 160 may pass through facing surfaces of the barrier walls 140 to be connected to the lower electrode 160 of an adjacent electrowetting device 100.

The electrowetting device 100 may further include a hydrophobic film (not shown) disposed in the upper electrode 130. The electrowetting device 100 may further include a second insulating layer (not shown) disposed between the upper electrode 130 and the hydrophobic film. However, if the second insulating layer is formed of a hydrophobic material, an additional hydrophobic film may not be included.

At least two upper electrodes 130 of the electrowetting device 100 may be included. The electrowetting device 100 may include four upper electrodes 130 in the example embodiment. Although there are four upper electrodes 130, a gradient of a refractive surface may be changed as a voltage is applied between facing electrodes.

Figure 5A:
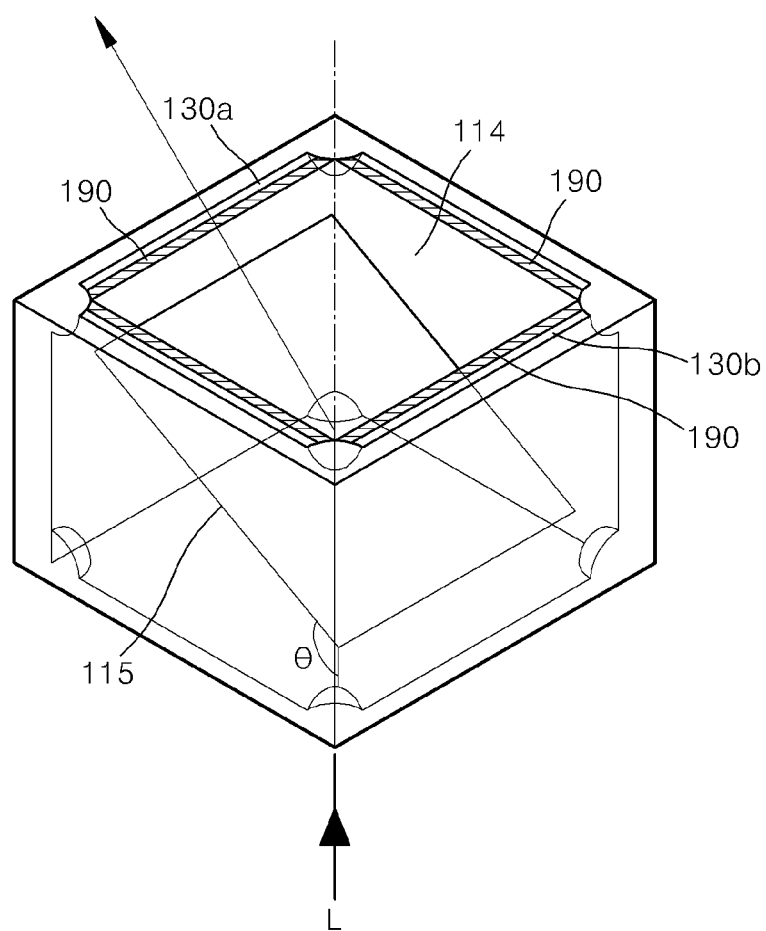
FIGS. 5A and 5B are views illustrating a change in a gradient of a boundary surface as a voltage is applied.
Figure 5B:
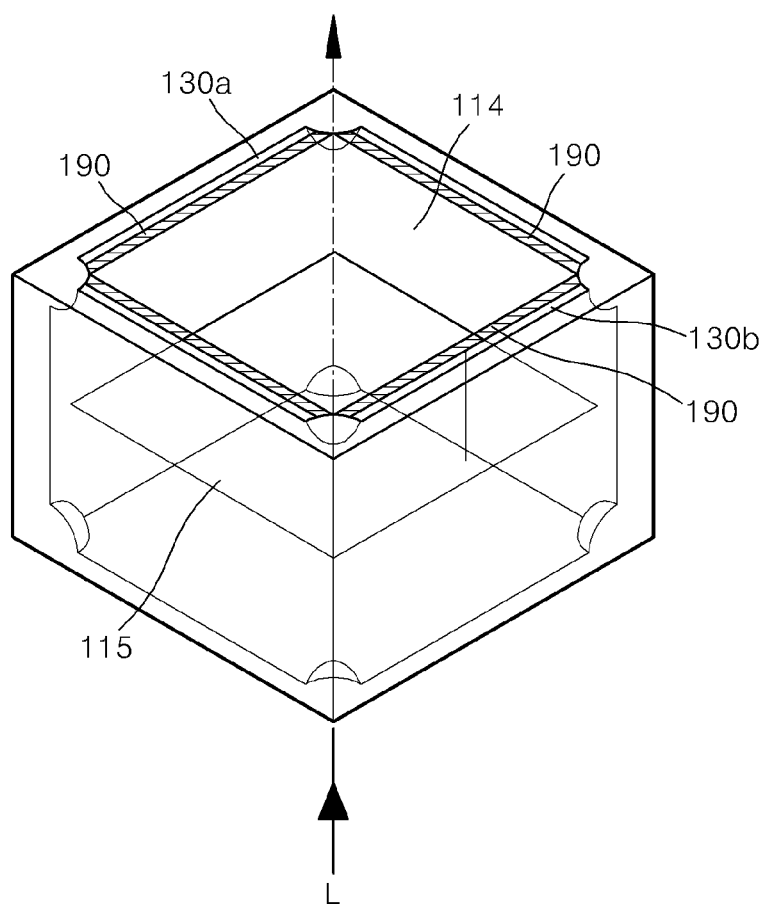

A change in a gradient of a boundary surface when a voltage is applied will now be explained. FIGS. 5A and 5B are views illustrating a change in a gradient of a boundary surface as a voltage is applied. For convenience of explanation, a method of operating the electrowetting device 100 will be explained by calling a left upper electrode a first upper electrode 130a and a right upper electrode a second upper electrode 130b.

When no voltage is applied to the first upper electrode 130a and the second upper electrode 130b, the first medium 112 is inclined at a contact angle θ with respect to a hydrophobic film 190. When a voltage is applied to the first upper electrode 130a and the second upper electrode 130b, the contact angle θ between the hydrophobic film 190 and the first medium 112 is reduced, thereby changing a gradient of the boundary surface 115. As the gradient of the boundary surface 115 is changed, a direction in which light is emitted is changed. As such, a direction in which light is emitted may be controlled by turning on or off or adjusting a magnitude of a voltage applied to the first upper electrode 130a and the second upper electrode 130b. In FIG. 5A, light L is refracted on the boundary surface 115 to the left. In FIG. 5B, the boundary surface 115 may be changed to be parallel to the light incident surface 117 by applying a voltage to the first upper electrode 130a and the second upper electrode 130b. In this case, the light L may perpendicularly pass through the boundary surface 115. A gradient of the boundary surface 115 may vary according to a magnitude or a polarity of a voltage applied to the first upper electrode 130a and the second upper electrode 130b. Once the gradient of the boundary surface 115 is changed, a direction in which light is emitted is changed.

Due to the first upper electrode 130a and the second upper electrode 130b disposed on left and right side surfaces of the barrier wall 140, the boundary surface 115 may be inclined in a left and right direction. Likewise, due to upper electrodes disposed on front and back side surfaces of the barrier wall 140, the boundary surface 115 may be inclined in a front and back direction, a detailed explanation thereof will not be given.

A plurality of the electrowetting devices 100 may be combined together to constitute an electrowetting device array.

Figure 6:
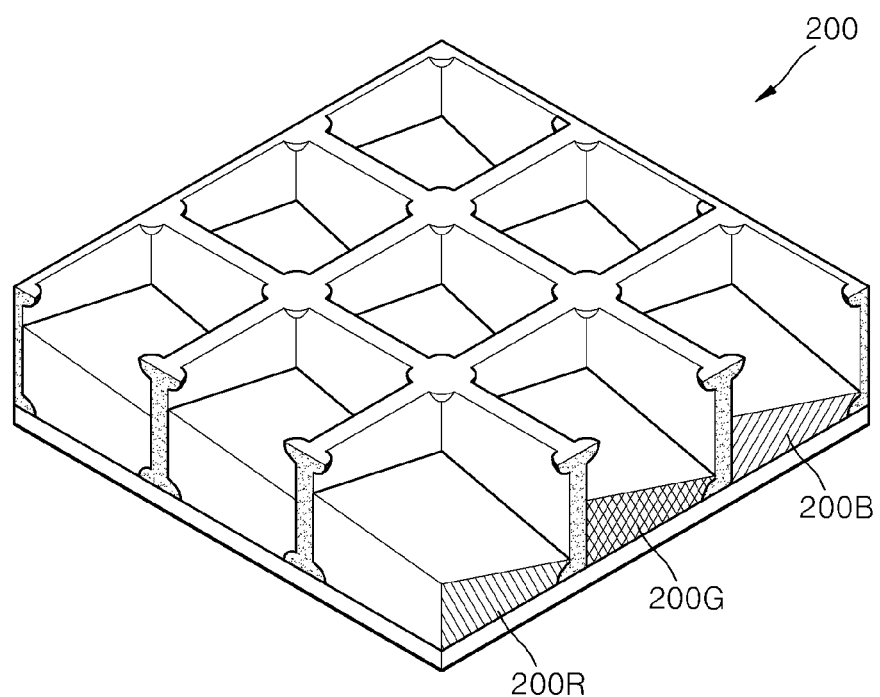
FIG. 6 is a perspective view illustrating an electrowetting device array according to an example embodiment.

FIG. 6 is a perspective view illustrating an electrowetting device array 200 according to an example embodiment. Referring to FIG. 6, the electrowetting device array 200 may include a plurality of electrowetting devices that are arranged in a two-dimensional (2D) structure. Each of the plurality of electrowetting devices may be the electrowetting device 100 of FIG. 1. The first medium 112 may have any one color of red, green, and blue. Accordingly, each electrowetting device 100 may be any one of a red electrowetting device 220R, a green electrowetting device 200G, and a blue electrowetting device 200B. The barrier walls 140 of the plurality of electrowetting devices 100 may be connected to one another in a 2D lattice structure. Accordingly, the barrier walls 140 of the electrowetting device array 200 may have uniform shapes.

Since the plurality of red, green, and blue electrowetting devices 200R, 200G, and 200B may adjust a direction in which light L travels as described below and may function as a color filter, an additional color filter of a display panel may not be necessary. Since a color filter may not be required, a process of aligning upper and lower plates, which is performed in a conventional method of manufacturing a display panel, may be omitted, thereby simplifying a process, improving product yield, and reducing costs.

Figure 7:
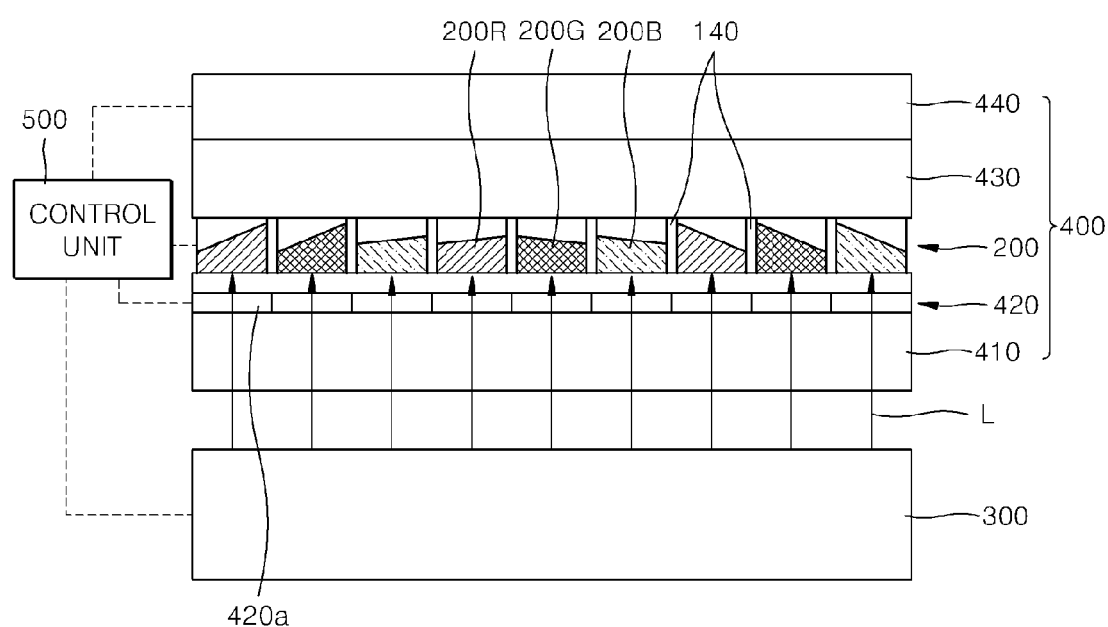
FIG. 7 is a cross-sectional view illustrating a two-dimensional/three-dimensional (2D/3D) switchable image display device using the electrowetting device of FIG. 1, according to an example embodiment.

FIG. 7 is a cross-sectional view illustrating a 2D/three-dimensional (3D) switchable image display device using the electrowetting device 100 of FIG. 1, according to an example embodiment.

Referring to FIG. 7, the 2D/3D switchable image display device may include a backlight unit 300, a display panel 400 that displays an image by modulating light L incident from the backlight unit 300 according to image information, and a control unit 500 that controls the backlight unit 300 and the display panel 400.

The backlight unit 300 that is disposed on a rear surface of the display panel 400 and emits light to the display panel 400 may include a surface light source. For example, the backlight unit 300 may include a light guide plate, and a light source disposed on a side surface of the light guide plate. The light source may be a surface light source in which point light sources are arranged in a 2D manner. Furthermore, a pattern for improving directivity of the light L or various types of optical films may be formed on a light-emitting surface of the backlight unit 300, to collimate light in a perpendicular direction to the light-emitting surface.

The display panel 400 may include a second substrate 410, a liquid crystal layer 420, the electrowetting device array 200, and a third substrate 430.

The second and third substrates 410 and 430, which respectively support the liquid crystal layer 420 and the electrowetting device array 200, may be formed of a transparent material such as glass or plastic. Electrical circuits (not shown) for driving the liquid crystal layer 420 and the electrowetting device array 200 may be disposed on the second and third substrates 410 and 430.

The liquid crystal layer 420 may include a plurality of liquid crystal cells 420a arranged in a 2D manner and forms image gradation by modulating light L incident from the backlight unit 300 according to image information. A pixel circuit (not shown) and a transparent electrode (not shown) for applying a voltage to the liquid crystal layer 420 may be disposed on a top surface of the second substrate 410. Accordingly, the image display device of FIG. 7 may not include a color filter.

The electrowetting device array 200 for assigning a color to a light beam transmitted through each liquid crystal cell 420a of the liquid crystal layer 420 and adjusting directivity may include the plurality of red, green, and blue electrowetting devices 200R, 200G, and 200B.

A method of operating the image display device in a 2D mode or a 3D mode will now be explained.

FIG. 8A is a cross-sectional view illustrating an operation of the image display device of FIG. 7 in a 3D mode. Referring to FIG. 8A, the electrowetting device array 200 may change and separate an optical path of each of the light beams L modulated by the liquid crystal cells 420a of the liquid crystal layer 420 into at least two different viewing zones. To this end, the control unit 500 may control a refraction angle by applying appropriate voltages to the red, green, and blue electrowetting devices 200R, 200G, and 200B, so that optical paths of the light beams L modulated by the liquid crystal cells 420a of the liquid crystal layer 420 are separated into viewing zones and focused. In this case, liquid crystal cells 420L corresponding to light beams L traveling toward a left eye $E_L$ display a left-eye image, and liquid crystal cells 420R corresponding to light beams L traveling toward a right eye $E_R$ display a right-eye image. The left-eye image $E_L$ and the right-eye image $E_R$ obtained by the electrowetting device array 200 may have a binocular disparity therebetween, thereby making a user perceive a stereoscopic image.

Light beams L, while passing through the electrowetting device array 200, may be assigned colors such as red, green, and blue according to pixels. A full color image may be achieved when red, green, and blue pixels are combined together. In this case, the red, green, and blue pixels may be combined by combining adjacent pixels on the display panel 400, or forming an image by using red, green, and blue pixels and overlapping the image with a user-side image. Such a combination may be performed by considering final color characteristics.

Although light beams L modulated by the liquid crystal layer 420 are each separated into two viewing zones in FIG. 8A, embodiments are not limited thereto. For example, the electrowetting device array 200 may separate light beams L modulated by the liquid crystal layer 420 each into three or more viewing zones, thereby enabling a plurality of users to observe an image or one user to observe an image even when he or she changes his or her position.

Although images having different disparities are simultaneously displayed on the display panel 400 in FIG. 8A, embodiments are not limited thereto. For example, a 3D image may be displayed by using a time multiplexing method in which the electrowetting device array 200 may be controlled such that the liquid crystal layer 420 sequentially displays images having different disparities and light beams are sent to viewing zones corresponding to the disparities. Since the time multiplexing method displays an image of one viewing zone by using all pixels of the liquid crystal layer 420, resolution decrease in a 3D mode may be compensated.

If a variable diffuser unit 440 is used, the control unit 500 may control the image display device to operate in a transparent mode in order not to scatter a light beam L passing through the variable diffuser unit 440, thereby maintaining viewing zone separation.

Furthermore, if the image display device further includes a sensor for sensing a position of the user, the control unit 500 may control the electrowetting device array 200 such that viewing zone separation is optimized for the position of the user, and the viewing zone separation varies according to a change in the position of the user.

Since the image display device performs viewing zone separation by adjusting paths of light beams L by using the red, green, and blue electrowetting devices 200R, 200G, and 200B, there may be no light loss during the viewing zone separation, and thus brightness in a 3D mode is higher than the brightness of a conventional 3D image display device using a barrier method.

Figure 8B:
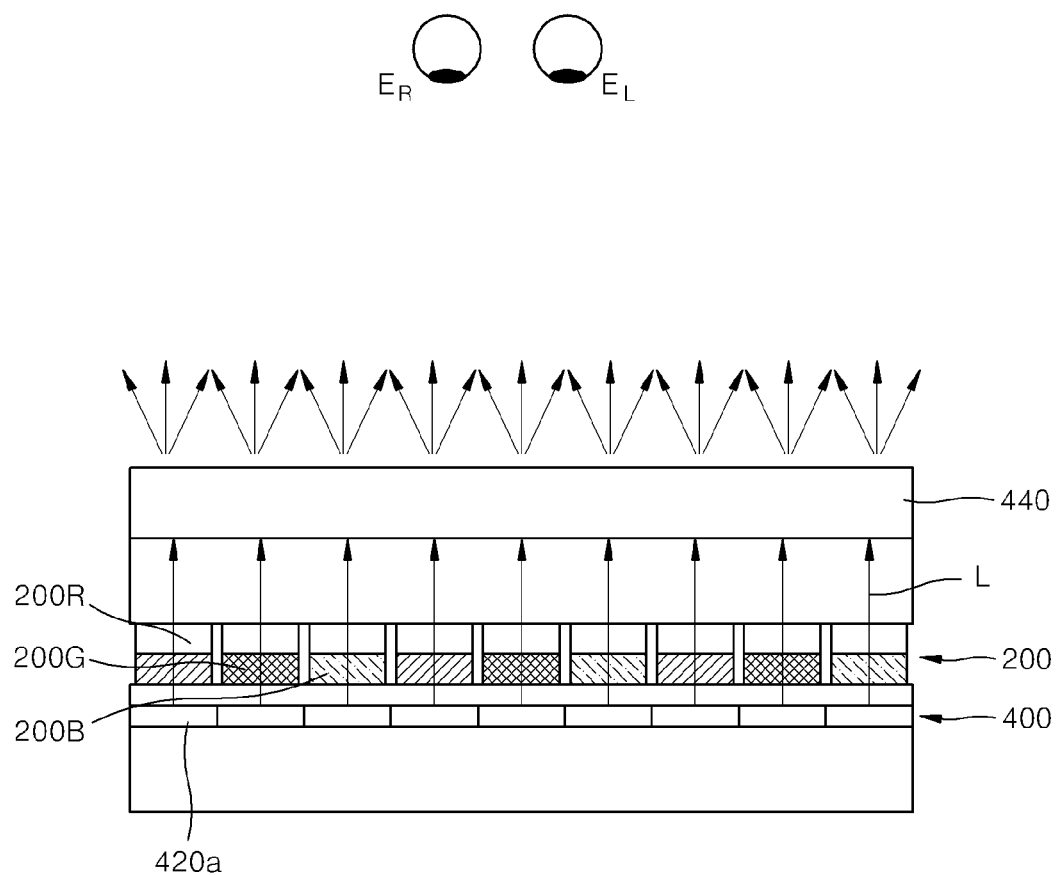
FIG. 8B is a cross-sectional view illustrating an operation of the image display device of FIG. 7 in a 2D mode.

FIG. 8B is a cross-sectional view illustrating an operation of the image display device of FIG. 7 in a 2D mode. Referring to FIG. 8B, the electrowetting device array 200 may not maintain optical paths of light beams L modulated by the liquid crystal cells 420a of the liquid crystal layer 420, so as not to perform viewing zone separation. To this end, as described above with reference to FIG. 4, the control unit 500 applies a voltage such that the boundary surface 115 of the first medium 110 and the second medium 120 of each of the red, green, and blue electrowetting devices 200R, 200G, and 200B may be parallel to the light incident surface 117. The liquid crystal layer 420 may form image gradation of a typical 2D image. Accordingly, since the left eye $E_L$ and the right eye $E_R$ of the user see the same image, a typical 2D image may be observed.

Furthermore, if the variable diffuser unit 440 is used, the control unit 500 may control the image display device to operate in a scattering mode to scatter each of the light beams L passing through the variable diffuser unit 440, thereby achieving a wide viewing angle. As such, since a wide viewing angle is achieved in a 2D mode, the liquid crystal layer 420 may operate in an inexpensive twisted nematic (TN) liquid crystal mode, thereby reducing process costs and reducing a response time.

Although the display panel 400 is a flat panel in which a light-modulating panel including the liquid crystal layer 420 and the electrowetting device array 200 are integrally formed, embodiments are not limited thereto. The light-modulating panel including the liquid crystal layer 420 and the electrowetting device array 200 may be manufactured as separate panels and then assembled.

A method of manufacturing the electrowetting device 100 of FIG. 1 will now be explained.

FIGS. 9 through 15 are cross-sectional views illustrating a method of manufacturing the electrowetting device 100 of FIG. 1, according to an example embodiment. One electrowetting device 100 may be manufactured or a plurality of the electrowetting devices 100 may be simultaneously manufactured. A method of manufacturing the plurality of electrowetting devices 100 will now be explained. In FIGS. 9 through 15, (a) is a cross-sectional view taken along line a-a of FIG. 1, illustrating a method of manufacturing the first portion 142 of the barrier wall 140 of each of the plurality of electrowetting devices 100, and (b) is a cross-sectional view taken along line b-b of FIG. 1, illustrating a method of manufacturing the second portion 144 of the barrier wall 140 of each of the plurality of electrowetting devices 100.

Figure 9:
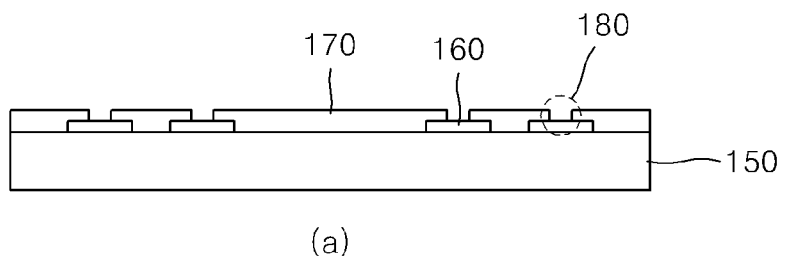
FIGS. 9 through 15 are cross-sectional views illustrating a method of manufacturing the electrowetting device of FIG. 1, according to an example embodiment.
Figure 9:
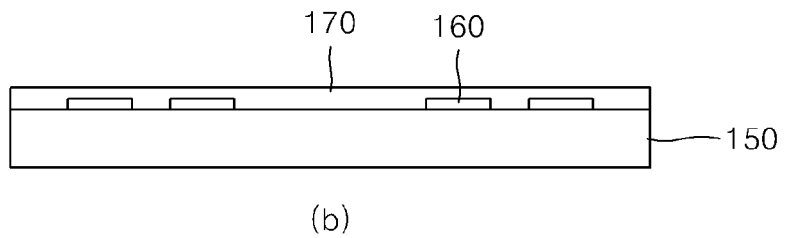

Referring to FIG. 9, the lower electrode 160 may be formed on the first substrate 150 which is transparent. The number of lower electrodes 160 may correspond to the number of upper electrodes 130 of the electrowetting device 100. For example, when the number of upper electrodes 130 of the electrowetting device 100 is 4, the number of lower electrodes 160 is 4. The first insulating layer 170 may be formed on the lower electrode 160 and the first substrate 150 to cover the lower electrode 160 and the first substrate 150. The via-hole 180 may be formed to expose a portion of the lower electrode 160. The via-hole 180 may be formed in front of the first portion 142 of the barrier wall 140.

Figure 10:
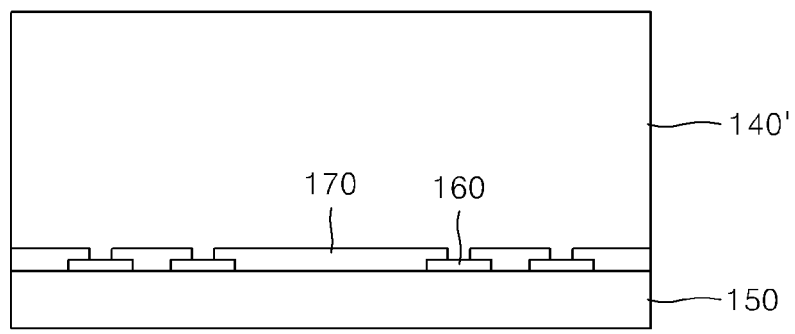
Figure 10:
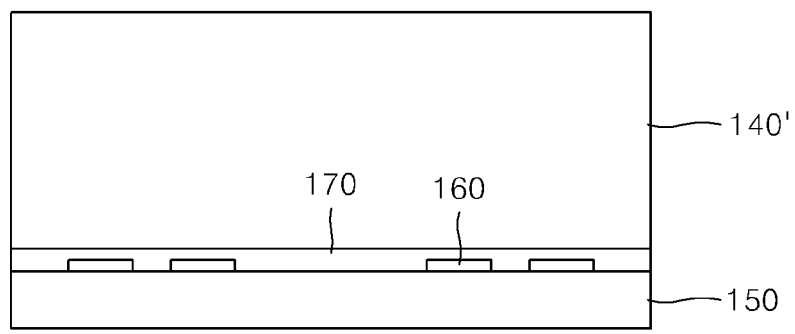

Referring to FIG. 10, a photosensitive material layer 140' may be formed on the first insulating layer 170 and the lower electrode 160. A height of a photosensitive material may be equal to a thickness of the barrier wall 140. The photosensitive material may be a negative organic material of which a light-exposed portion during development remains, for example, a negative photoresist.

Figure 11:
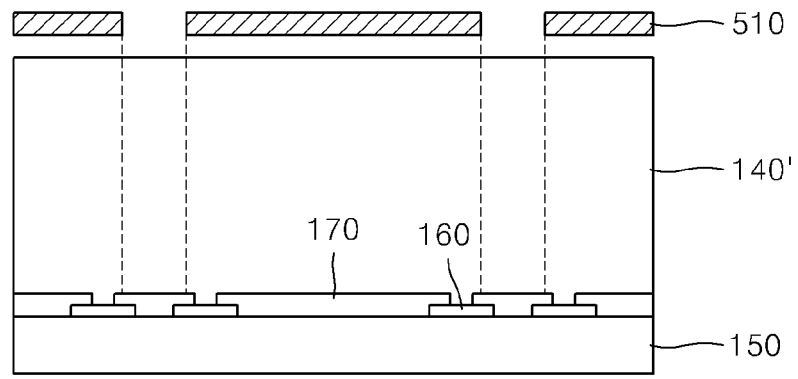
Figure 11:
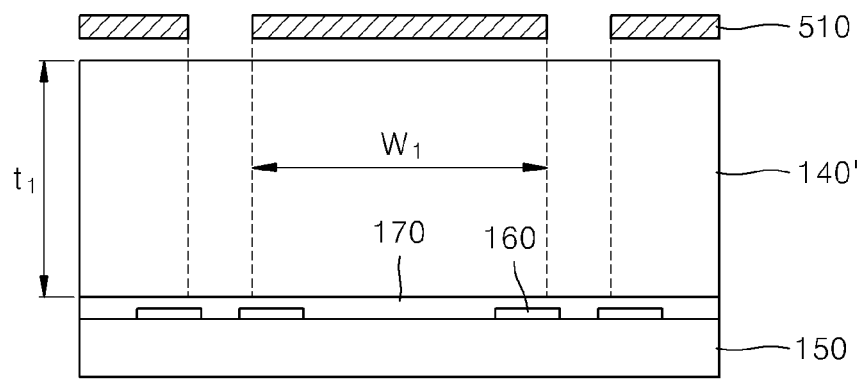

Referring to FIG. 11, a first exposure mask 510 that covers a region W1 of the photosensitive material layer 140' where the cell region 110 and the protrusion 145 are to be disposed may be located on the photosensitive material. First exposure may be performed through the first exposure mask 510. The amount of light exposed during the first exposure may be large enough for a total thickness t1 of the photosensitive material layer 140' to react with emitted light and to induce cross-linking.

Figure 12:
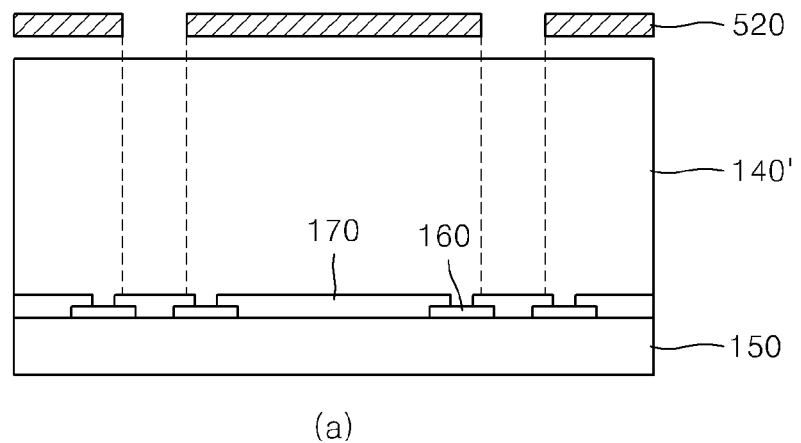
Figure 12:
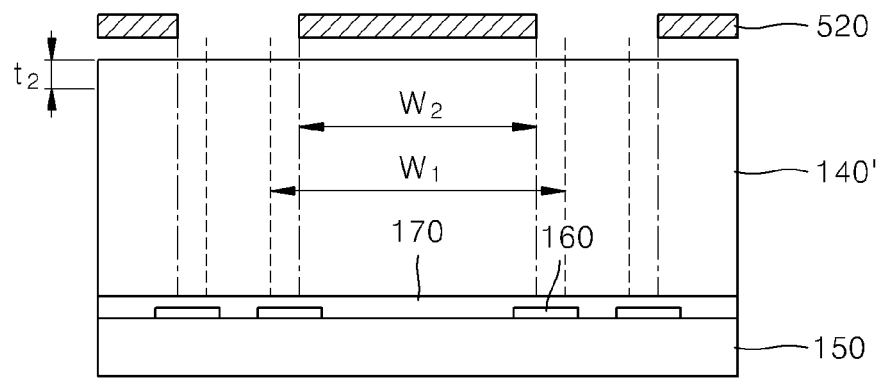

The first exposure mask 510 may be removed. Referring to FIG. 12, a second exposure mask 520 that covers a region W2 of the photosensitive material layer 140' where the cell region 110 is to be disposed may be located on the photosensitive material. Second exposure may be performed. The amount of light exposed during the second exposure may be large enough for a partial thickness $t_2$ of the photosensitive material to react with emitted light and to induce cross-linking. An order in which the first exposure and the second exposure are performed in FIGS. 11 and 12 may be changed.

Figure 13:
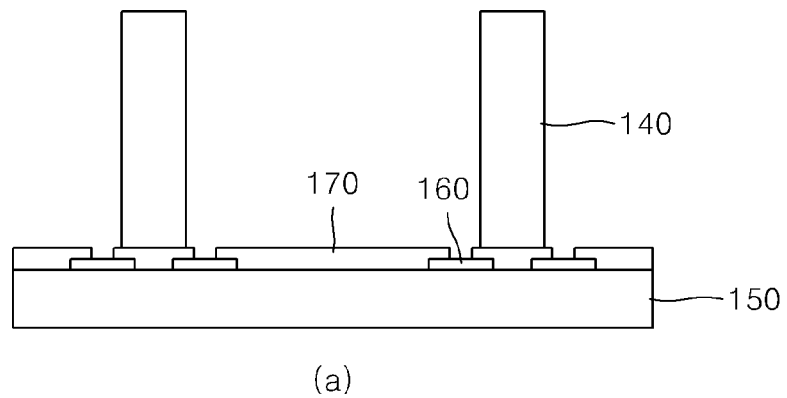
Figure 13:
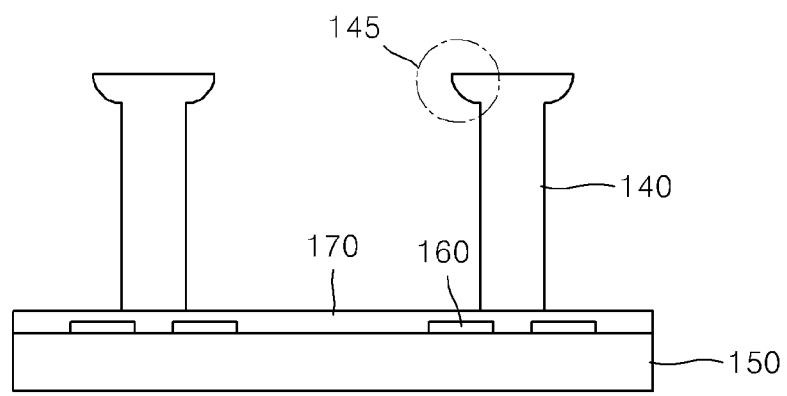

Referring to FIG. 13, the barrier wall 140 including the first portion 142 and the second portion 144 may be formed on a surface of the first substrate 150 by exposing the photosensitive material layer 140' subjected to the second exposure to a developer and removing portions of the photosensitive material layer 140' where cross-linking does not occur. Since cross-linking occurs in a portion of the second portion 144, the protrusion 145 laterally may protrude from the second portion 144.

The barrier wall 140 may be completely hardened by performing hard baking.

Figure 14:
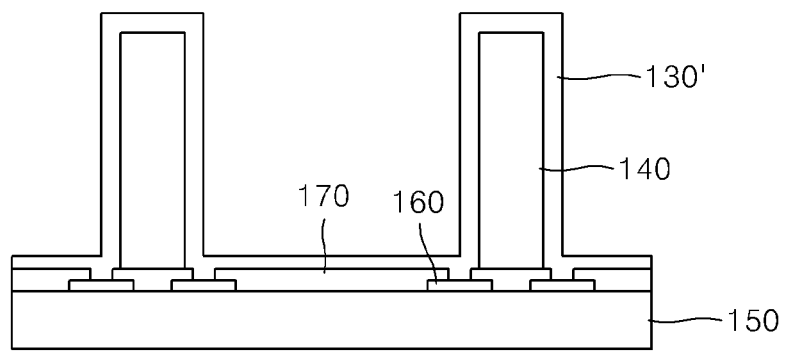
Figure 14:
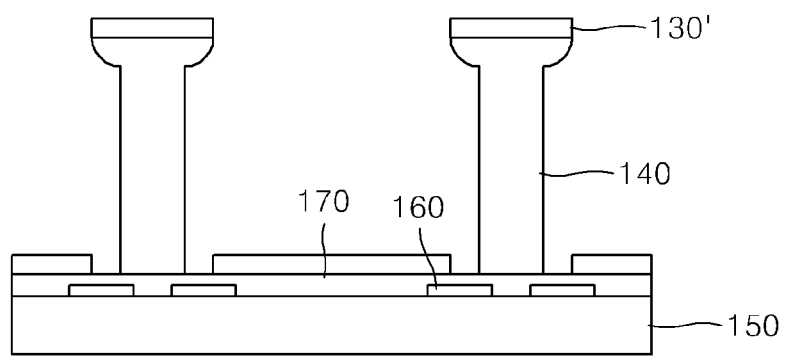

Referring to FIG. 14, a transparent conductive material 130' may be deposited on the first substrate 150 on which the barrier wall 140 is formed. The conductive material 130' may be disposed on a top surface of the barrier wall 140, side surfaces of the first portion 142 of the barrier wall 140, and on the first insulating layer 170 and the via-hole 180. However, since the protrusion 145 laterally protrudes from the second portion 144 of the barrier wall 140, the conductive material 130' may be deposited on upper surfaces of the second portion 144 of the barrier wall 140 and may not be deposited on side surfaces of the second portion 144 of the barrier wall 140. Accordingly, the conductive material 130' may be separately deposited on the side surfaces of the barrier wall 140. As described above, since the protrusion 145 laterally protrudes from the barrier wall 140, the upper electrode 130 may be easily patterned.

Figure 15:
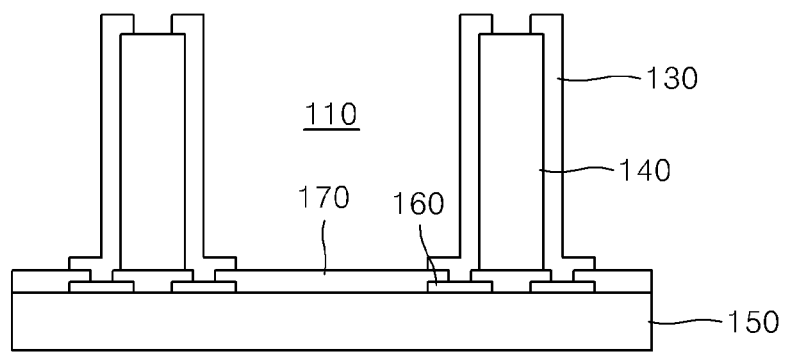
Figure 15:
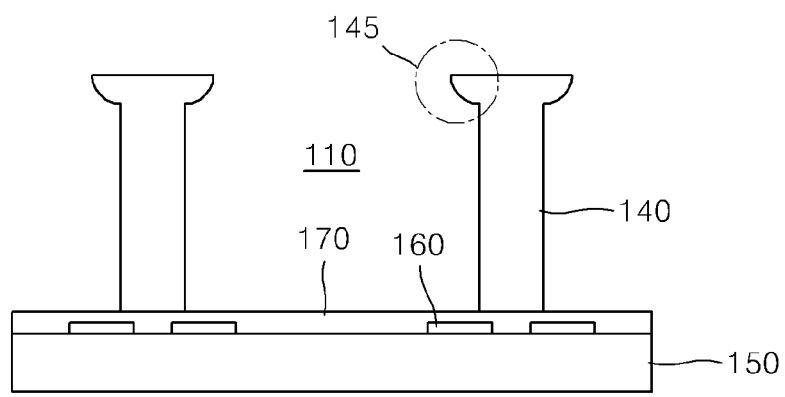

Referring to FIG. 15, the upper electrode 130 may be formed by removing a portion of the conductive material 130' which is not used as the upper electrode 130.

The electrowetting device 100 may be completed by injecting the first medium 112 and the second medium 114 into the cell region 110. The first medium 112 and the second medium 114 may not be mixed with each other, and may have different refractive indices.

Since a width of a portion of a barrier wall on which an electrode is not disposed may be greater than a width of a portion of the barrier wall on which an electrode is disposed, the electrode may be easily formed when an electrowetting device is manufactured.

While example embodiments have been particularly shown and described with reference to exemplary embodiments thereof, it will be understood by those of ordinary skill in the art that various changes in form and details may be made therein without departing from the spirit and scope of the example embodiments as defined by the following claims.

What is claimed is:

1. An electrowetting device comprising:
a first medium;
a second medium, the second medium not mixed with the first medium and having a refractive index different from a refractive index of the first medium;
an upper electrode, the upper electrode configured to adjust an angle of a boundary surface between the first medium and the second medium; and
a barrier wall, a side surface of the barrier wall surrounding the first and second mediums, the barrier wall having the upper electrode on a portion of the side surface and having irregular widths,
wherein the barrier wall includes
a first portion on which the upper electrode is disposed,
a second portion connected to the first portion and having a width greater than a width of the first portion, and
a protrusion protruding laterally from an upper end of the second portion.

2. The electrowetting device of claim 1, wherein the protrusion has a tapered shape, the width of which is reduced downward.

3. The electrowetting device of claim 1, further comprising:
a substrate;
a lower electrode, the lower electrode partially disposed on the substrate; and
an insulating layer, the insulating layer disposed on the substrate and the lower electrode and having a via-hole through which the lower electrode is partially exposed,
wherein the upper electrode is connected to the lower electrode through the via-hole.

4. The electrowetting device of claim 1, wherein the barrier wall comprises a photosensitive material.

5. The electrowetting device of claim 1, further comprising:
an insulating layer that has a hydrophobic surface covering the upper electrode.

6. The electrowetting device of claim 1, wherein the first medium is a non-polar liquid comprising a color dye, and the second medium is a polar liquid.

7. The electrowetting device of claim 1, wherein the first medium is a polar liquid comprising a color dye, and the second medium is a non-polar liquid.

8. An electrowetting device array comprising a plurality of the electrowetting devices of claim 1,
wherein the plurality of electrowetting devices are arranged in a two-dimensional (2D) lattice structure.

9. The electrowetting device array of claim 8, wherein the barrier walls of the plurality of electrowetting devices are connected to one another.

10. An image display device comprising:
a light source configured to emit light;
a light-modulating panel configured to modulate the light according to image information and to form image gradation; and
an electrowetting device array including a plurality of the electrowetting devices of claim 1 configured to adjust directivity by assigning a color to each of the light beams transmitted through pixels of an image.

11. The image display device of claim 10, further comprising:
a control unit configured to control the electrowetting device array such that light beams of a plurality of pixels of the image are separated into at least two different viewing zones in a three-dimensional (3D) mode, and paths of the light beams of the plurality of pixels of the image are maintained in a 2D mode.

12. The image display device of claim 10, wherein the control unit is configured to control the boundary surface to be inclined with respect to the light-modulating panel in the 3D mode, and to be parallel to the light-modulating panel in the 2D mode.

13. The image display device of claim 10, wherein the electrowetting device array comprises:
a first electrowetting device including the first medium of a red color;
a second electrowetting device including the first medium of a green color; and
a third electrowetting device including the first medium of a blue color.

14. A method of manufacturing an electrowetting device, the method comprising:
forming a lower electrode on a substrate;
forming a photosensitive material layer on the substrate and the lower electrode;

forming a barrier wall having irregular widths and providing a cell region by exposing the photosensitive material to light;

depositing an upper electrode on a portion of the barrier wall; and injecting into the cell region a first medium and a second medium, the second medium not being mixed with the first medium and having a refractive index different from a refractive index of the first medium, wherein a protrusion protrudes laterally from an upper end of the barrier wall.

15. The method of claim 14, wherein the protrusion has a tapered shape, and a width of the protrusion is reduced downward.

16. The method of claim 14, wherein the barrier wall is formed by using a plurality of different exposure masks.

17. The method of claim 14, wherein the forming of the barrier wall comprises:

disposing a first exposure mask on the photosensitive material layer to cover the cell region and the protrusion;

performing first exposure;

disposing a second exposure mask on the photosensitive material layer to cover the cell region;

performing second exposure; and exposing an exposed portion of the photosensitive material layer to a developer.

18. The method of claim 17, wherein an amount of light exposed during the first exposure is greater than an amount of light exposed during the second exposure.

19. The method of claim 14, wherein the upper electrode is deposited on a portion of a side surface of the barrier wall where the protrusion is not formed.

20. The method of claim 14, before the forming of the photosensitive material layer, the method further comprising:

forming an insulating layer on the substrate and the lower electrode; and forming in the insulating layer a via-hole through which the lower electrode is partially exposed.

* * * * *